United States Patent
Sheplak et al.

(10) Patent No.: US 7,092,539 B2
(45) Date of Patent: Aug. 15, 2006

(54) MEMS BASED ACOUSTIC ARRAY

(75) Inventors: Mark Sheplak, Gainesville, FL (US); Toshikazu Nishida, Gainesville, FL (US); William M. Humphreys, Newport News, VA (US); David P. Arnold, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 939 days.

(21) Appl. No.: 09/997,113

(22) Filed: Nov. 28, 2001

(65) Prior Publication Data

US 2002/0149070 A1  Oct. 17, 2002

Related U.S. Application Data

(60) Provisional application No. 60/253,525, filed on Nov. 28, 2000.

(51) Int. Cl.
  *H04R 3/00* (2006.01)
  *H04R 25/00* (2006.01)
  *H01L 27/102* (2006.01)

(52) U.S. Cl. .................. 381/114; 381/111; 381/173; 381/190; 257/528

(58) Field of Classification Search .............. None
  See application file for complete search history.

(56) References Cited

U.S. PATENT DOCUMENTS

| | | | | |
|---|---|---|---|---|
| 4,119,007 A | * | 10/1978 | Criglar et al. | ............ 84/730 |
| 6,669,489 B1 | * | 12/2003 | Dozier, II et al. | ......... 439/71 |
| 2001/0033670 A1 | * | 10/2001 | Tai et al. | ................ 381/174 |
| 2003/0035558 A1 | * | 2/2003 | Kawamura et al. | ........ 381/113 |

OTHER PUBLICATIONS

"Sound and Sources of Sound," Dowling et al., Ellis Horwood, Ltd., Chp. 7, 147-167 (1983).

"Design and Use of Microphone Directional Arrays for Aeroacoustic Measurements," Humphreys, Jr. et al., AIAA Paper 98-0471, 1-24 (1998).

"A Directional Array Approach for the Measurement Rotor Source Distributions with Controlled Spatial Resolution," Brooks, et al., *Journal of Sound and Vibration* vol. 112(1):192-197 (1987).

(Continued)

*Primary Examiner*—Laura A. Grier
(74) *Attorney, Agent, or Firm*—Akerman Senterfitt; Neil R. Jetter

(57) ABSTRACT

Embodiments of the present invention described and shown in the specification and drawings include a combination responsive to an acoustic wave that can be utilized as a dynamic pressure sensor. In one embodiment of the present invention, the combination has a substrate having a first surface and an opposite second surface, a microphone positioned on the first surface of the substrate and having an input and a first output and a second output, wherein the input receives a biased voltage, and the microphone generates an output signal responsive to the acoustic wave between the first output and the second output. The combination further has an amplifier positioned on the first surface of the substrate and having a first input and a second input and an output, wherein the first input of the amplifier is electrically coupled to the first output of the microphone and the second input of the amplifier is electrically coupled to the second output of the microphone for receiving the output signal from the microphone. The amplifier is spaced from the microphone with a separation smaller than 0.5 mm.

23 Claims, 14 Drawing Sheets

OTHER PUBLICATIONS

"Aeroacroustic Measurements of a Wing-Flap Configuration," K. R. Meadows, et al., AIAA Paper 97-1595, 1-20, 1997.

"Microelectromechanical Systems, Advance Materials and Fabrications Methods," *National Research Council*, NMAB-483, National Academy Press, 1997.

"A Review of Silicon Microphones," R.P Scheeper, A.G.H. van de Donk, W. Olthuis and P. Bergveld, Sensors and Actuators A vol. 44, 1-11 (1994).

"A Theoretical Study of Transducer Noise in Piezoresistive and Capacitive Silicon Pressure Sensors," R. R. Spencer, B.M. Fleischer, P.W. Barth, and J.B. Angell, *IEEE Transaction of Electron Devices*, vol. ED-35:1289-1298, 1988.

"Pressure and Wall Shear Stress Sensors for Tubulence Measurements," Kalvesten et al, Thesis, Royal Institute of Technology, Stockholm, Sweden (1996).

Small Silicon Based Pressure Transducers for Measurements in Turbulent Boundary Layer, Lofdahl et al., *Experiments Fluids*, vol. 17, 24-31 (1994).

"A Small-Size Silicon Microphone for Measurements in Turbulent Gas Flows," Kalvesten et al., *Sensors and Actuators*, vol. 45, 103-108 (1994).

"A Silicon Subminiature Microphone Based on Piezoresistive Polysilicon Strain Gauges," Schellin et al., *Sensors and Actuators*, vol. 32, 555-559 (1992).

"Low Pressure Acoutic Sensors for Airborne Sound With Piezoresistive Monocrystalline Silicon and Electrochemically etched Diaphragms," Schellin et al. *Sensors and Actuators*, vol. 46 (47), 156-160 (1995).

"A Wafer-Bonded, Silicon-Nitride Membrane Microphone with Dielectrically-Isolated, Single-Crystal Silicon PiezoResistors," Sheplak et al., Technical Digest, Solid-State Sensor and Actuator Workshop, Hilton Head, SC, Jun. 23-26, 1998.

Kulite Semiconductor Products, Inc. MIC-093 specification sheet.

"Large Deflections of Clamped Circular Plates Under Tension and Transitions to Membrane Behavior," Sheplak et al., *Journal of Applied Mechanics*, vol. 65, No. 1, 107-115 (1998).

"Scaling Relations for Piezoresistive Microphones," Saini, et al., Proceedings of IMECE 2000: International Mechanical Engineering Congress and Exposition, Orlando, FL, Nov. 5-10, 2000.

A Model of $1/f$ Noise in Polysilicon Resistors, S.L. Jang, *Solid-State Electron*, vol. 33, 1155-1162 (1990).

"A Piezoresistive Microphone for Aeroacoustic Measurements," Arnold et al., Proceedings of 2001 ASME International Mechanical Congress and Exposition, New York, NY, Nov. 11-16, 2001.

* cited by examiner

MEMS BASED ACOUSTIC ARRAY

CROSS-REFERENCE TO RELATED PATENT APPLICATION

This application is a continuation-in-part and claims the benefit, pursuant to 35 U.S.C. § 119(e), of provisional U.S. patent application Ser. No. 60/253,525, filed Nov. 28, 2000, entitled "MEMS BASED ACOUSTIC ARRAY," which is incorporated herein in its entirety by reference.

This invention was made partially with Government support under Grant No. NAG-1-2133 awarded by NASA Langley Research Center and the Government has certain rights in this invention.

BACKGROUND OF THE INVENTION

1. Field of the Invention

The present invention relates generally to an acoustic combination responsive to an acoustic wave, and more particularly, to an acoustic combination that can be utilized as a dynamic pressure sensor and a microelectromechanical systems (MEMS)-based acoustic array that utilizes the acoustic combination.

2. Background

As aircraft noise regulations become more stringent, the need for modeling and measuring aircraft noise phenomena becomes more important. In order to intelligently design quieter aircraft, the physical mechanisms of noise generation should be understood and any theoretical or computational noise model should be experimentally validated. One validation method is the comparison of the theoretical and measured acoustic far-field pressures. However, single microphone measurements of aeroacoustic sources in wind tunnels are hampered by poor signal to noise ratios that arise from microphone wind self-noise, tunnel system drive noise, reverberation, and electromagnetic interference. In addition, a single microphone cannot distinguish pressure contributions from different source locations. The need for more precise noise source characterization and localization has driven the development of advanced sound field measurement techniques. In particular, the development and application of directional (phased) microphone arrays have been documented as a means to localize and characterize aeroacoustic sources in the presence of high background noise.

Although knowledge of the acoustic field does not uniquely define the source, localization of a source and analyses of the spatial and temporal characteristics of its far-field radiation can provide insight into noise generation mechanisms. Modern acoustic arrays used in wind tunnel studies of airframe noise are typically constructed of moderate numbers ($\leq 100$) of instrumentation grade condenser microphones, and range in aperture size from several inches to several feet. Data collection, followed by extensive post-processing has been used to implement various beamforming processes, including conventional beamforming, array shading, shear-layer corrections, adaptive methods, etc. The resulting data files can be over 500 GB in size and require up to an hour of post-processing per data set.

Greater numbers of microphones in an array can improve the ability to characterize a sound field. A greater number of microphones enhances the signal to noise ratio of an array, defined as the array gain, given (in dB) by $10*\log(M)$, where M is the number of microphones. In addition, a large number of microphones may be used to extend the frequency range of an array. The spatial resolution of an array is related to the product $kD$, where $k=\omega/c$ is the acoustic wavenumber, $\omega$ is the radian frequency, c is the speed of sound, and D is the aperture size. Thus, a larger aperture is needed to improve the spatial resolution of an array, of most concern at low frequencies. In contrast, the intersensor spacing must be kept less than one-half of the smallest wavelength of interest (highest frequency) to avoid spatial aliasing. The feasibility of scaling the current technology to multiple arrays with large numbers (hundreds or thousands) of microphones is limited by the cost per channel (microphone, amplifier, data acquisition), data handling efficiency (acquisition capabilities, signal processing complexity, storage requirements), and array mobility (size, weight, cabling). In addition, experiments performed in large wind tunnels are costly and require extensive setup. Thus, an array system that provides near real-time output would be advantageous.

Thus, there is a need to develop a new acoustic array system that, among other applications, can be utilized for aeroacoustic measurement.

SUMMARY OF THE INVENTION

In accordance with the purposes of this invention, as embodied and broadly described herein, this invention, in one aspect, relates to a combination responsive to an acoustic wave that can be utilized as a dynamic pressure sensor. For example, the combination in a form of acoustic array can be utilized as a dynamic pressure sensor for aeroacoustic measurements for airframe noise mechanism identification and source localization. In one embodiment of the present invention, the combination has a substrate having a first surface and an opposite second surface, a microphone positioned on the first surface of the substrate and having an input and a first output and a second output, wherein the input receives a biased voltage, and the microphone generates an output signal responsive to the acoustic wave between the first output and the second output. The combination further has an amplifier positioned on the first surface of the substrate and having a first input and a second input and an output, wherein the first input of the amplifier is electrically coupled to the first output of the microphone and the second input of the amplifier is electrically coupled to the second output of the microphone for receiving the output signal from the microphone. The amplifier is spaced from the microphone with a separation smaller than 0.5 mm.

The substrate comprises a semiconductor material such as silicon. The microphone can be chosen from a variety of available devices. In one embodiment, the microphone comprises a piezoresistive microphone that has a semiconductor substrate having a cavity, a diaphragm covering the cavity, and at least one piezoresistor positioned on top of the diaphragm, wherein when the cavity receives the acoustic wave, the diaphragm moves in response to cause stress in the piezoresistor, and the piezoresistor generates an electric signal responsive to the acoustic wave. The piezoresistor is electrically coupled to the first and second outputs of the microphone to cause an electrical voltage as output signal from the electric signal responsive to the acoustic wave. The combination may further have at least one resistor electrically coupled to the piezoresistor. In one embodiment, the microphone comprises four piezoresistors forming a Wheatstone bridge. Each piezoresistor can be a single-crystal silicon piezoresistor, wherein the piezoresistor may be silicon-dioxide encapsulated. The diaphragm may be a silicon-nitride membrane.

The combination may further include a channel in fluid communication with the cavity and the ambient atmosphere, wherein the channel is positioned on the surface of the semiconductor substrate and terminated at one end with a vent hole in fluid communication with the ambient atmosphere.

In another aspect, the present invention relates to a method of assembling a combination responsive to an acoustic wave. In one embodiment, the method includes the steps of providing a substrate having a first surface and an opposite second surface, positioning a microphone on the first surface of the substrate, and positioning an amplifier on the first surface of the substrate spaced from the microphone with a separation smaller than 0.5 mm. The microphone has an input and a first output and a second output, and the amplifier has a first input electrically coupled to the first output of the microphone and a second input electrically coupled to the second output of the microphone and an output. The substrate comprises a silicon layer. The microphone can be a piezoresistive microphone.

In a further aspect, the present invention relates to a combination responsive to an acoustic wave. In one embodiment, the combination includes a microphone having an input and a first output and a second output, wherein the input receives a biased voltage, and the microphone generates an output signal responsive to the acoustic wave between the first output and the second output. The combination further includes an amplifier having a first input and a second input and an output, wherein the first input of the amplifier is electrically coupled to the first output of the microphone and the second input of the amplifier is electrically coupled to the second output of the microphone for receiving the output signal from the microphone. Additionally, the combination includes a first high pass filter electrically coupled between the first input of the amplifier and the first output of the microphone, and a second high pass filter electrically coupled between the second input of the amplifier and the second output of the microphone, wherein the output signal from the microphone has a DC component and an AC component, and the first and second high pass filters substantially block the DC component and allow the AC component of the output signal from the microphone to pass, thereby to allow the amplifier to generate a low impedance signal at the output.

In one embodiment, the microphone comprises four piezoresistors forming a Wheatstone bridge that has a first arm, an opposing second arm, a third arm, and an opposing fourth arm, the first arm being electrically coupled to the input of the microphone, the opposing second arm being electrically coupled to ground, the third arm being electrically coupled to the first input of the amplifier, and the opposing fourth arm being electrically coupled to the second input of the amplifier. The amplifier is a preamplifier. The first high pass filter comprises a resistor and a capacitor, the capacitor being electrically coupled in series between the third arm of the Wheatstone bridge and the first input of the amplifier, and the resistor being electrically coupled in parallel between the second arm of the Wheatstone bridge and the capacitor. Moreover, the second high pass filter comprises a resistor and a capacitor, the capacitor being electrically coupled in series between the fourth arm of the Wheatstone bridge and the second input of the amplifier, and the resistor being electrically coupled in parallel between the second arm of the Wheatstone bridge and the capacitor. The resistor of the first high pass filter and the resistor of the second high pass filter are jointly coupled to the second arm of the Wheatstone bridge. The resistor of the first high pass filter and the resistor of the second high pass filter are substantially identical to each other. For example, each of the resistor of the first high pass filter and the resistor of the second high pass filter can be a low profile surface mount resistor. The capacitor of the first high pass filter and the capacitor of the second high pass filter are substantially identical to each other. For example, each of the capacitor of the first high pass filter and the capacitor of the second high pass filter is a low profile surface mount capacitor.

In yet another aspect, the present invention relates to a combination responsive to an acoustic wave. In one embodiment, the combination includes a semiconductor substrate having a first surface and a second surface, a microphone positioned on the first surface of the semiconductor substrate and having an input and a first output and a second output, wherein the input receives a biased voltage, and the microphone generates an output signal responsive to the acoustic wave between the first output and the second output, an amplifier positioned on the first surface of the semiconductor substrate and having a first input and a second input and an output, wherein the first input of the amplifier is electrically coupled to the first output of the microphone and the second input of the amplifier is electrically coupled to the second output of the microphone for receiving the output signal from the microphone, a first capacitor and a first resistor forming a first RC pair positioned on the first surface of the semiconductor substrate and being electrically coupled between the first input of the amplifier and the first output of the microphone, and a second capacitor and a second resistor forming a second RC pair positioned on the first surface of the semiconductor substrate and being electrically coupled between the second input of the amplifier and the second output of the microphone. The output signal from the microphone has a DC component and an AC component, and the first and second RC pairs substantially block the DC component and allow the AC component of the output signal from the microphone to pass, thereby to allow the amplifier to generate a low impedance signal at the output, and wherein the amplifier is spaced from the microphone with a separation smaller than 0.5 mm.

In one embodiment, the microphone comprises four piezoresistors forming a Wheatstone bridge that has a first arm, an opposing second arm, a third arm, and an opposing fourth arm, the first arm being electrically coupled to the input of the microphone, the opposing second arm being electrically coupled to ground, the third arm being electrically coupled to the first input of the amplifier, and the opposing fourth arm being electrically coupled to the second input of the amplifier. The first capacitor is electrically coupled in series between the third arm of the Wheatstone bridge and the first input of the amplifier, and the first resistor is electrically coupled in parallel between the second arm of the Wheatstone bridge and the capacitor. Additionally, the second capacitor is electrically coupled in series between the fourth arm of the Wheatstone bridge and the second input of the amplifier, and the second resistor is electrically coupled in parallel between the second arm of the Wheatstone bridge and the capacitor. The first resistor and the second resistor are jointly coupled to the second arm of the Wheatstone bridge. The semiconductor substrate comprises a silicon layer, which can be passivated with silicon dioxide. The combination may further comprise a plurality of metal bond pads for receiving components positioned on the silicon layer, and a plurality of conductive traces for interconnecting corresponding metal bond pads.

The combination may further comprise a package positioned underneath the semiconductor substrate. In one embodiment, the package has a body for supporting the semiconductor substrate, and a plurality of pins, each pin being conductive and penetrating through the body. The body is electrically coupled to ground for electromagnetic shielding. The combination can additionally have a plurality of metal wire bonds, wherein each metal wire bond may make an additional electrical coupling to the metal bond pads and the pins. Each metal wire bond may be a gold wire bond.

In another embodiment, the combination may further have a package positioned underneath the semiconductor substrate. The package has a body for supporting the semiconductor substrate, and a peripheral portion extending away from the package body. The body is electrically coupled to ground for electromagnetic shielding. The combination further has a lid positioned above the semiconductor substrate. The lid includes a body, and a peripheral portion extending away from the body. The lid body is complementarily sized such that when the lid is positioned over the semiconductor substrate, the peripheral portion of the lid matches to and supported by the peripheral portion of the package, and the body covers the semiconductor substrate and components positioned on the semiconductor substrate. The lid may be made from a material that is substantially transparent to the acoustic wave. Additionally, the lid is electrically coupled to ground for electromagnetic shielding.

In another aspect, the present invention relates to a printed circuit board array responsive to an acoustic wave. In one embodiment, the printed circuit board array includes a printed circuit board having a first surface and an opposing second surface, a plurality of sockets distributed over the first surface of the printed circuit board, a laser diode positioned on the first surface of the printed circuit board for aiming the printed circuit board array toward to the acoustic wave, and a plurality of microphone packages, wherein each microphone package is complimentarily sized and received in a corresponding socket and contains at least one microphone responsive to the acoustic wave.

The printed circuit board array may further include at least one SMB-type coaxial cable connector positioned on the second surface of the printed circuit board. An SMB-type coaxial cable connector is a type of connector usually used for coaxial cable connections for RF (radio frequency) applications, as known to people skilled in the art. Moreover, the printed circuit board array has at least one support layer positioned above the first surface of the printed circuit board, and at least one support layer positioned below the second surface of the printed circuit board. Each of the support layers may comprise a garolite stiffening layer, which may be bonded to the printed circuit board.

In one embodiment, the printed circuit board comprises a double-sided copper clad. The printed circuit board has a center, and the plurality of microphone packages are distributed over the first surface of the printed circuit board along a plurality of concentric rings, each ring having a radius measured from the center of the printed circuit board different from the radius of any other ring. An equal or unequal number of the microphone packages are distributed over each ring, wherein each microphone package has at least one microphone responsive to the acoustic wave and at least one amplifier coupled to and spaced from the microphone with a separation smaller than 0.5 mm.

These and other aspects will become apparent from the following description of various embodiments taken in conjunction with the following drawings, although variations and modifications may be effected without departing from the spirit and scope of the novel concepts of the disclosure.

BRIEF DESCRIPTION OF THE DRAWINGS

The accompanying drawings, which are incorporated in and constitute a part of this specification, illustrate several embodiments of the invention and the corresponding experimental results and together with the description, serve to explain the principals of the invention.

DETAILED DESCRIPTION OF THE INVENTION

The present invention is more particularly described in the following examples that are intended to be illustrative only since numerous modifications and variations therein will be apparent to those skilled in the art. As used in the specification and in the claims, the singular form "a," "an" and "the" include plural referents unless the context clearly dictates otherwise.

Figure 1:
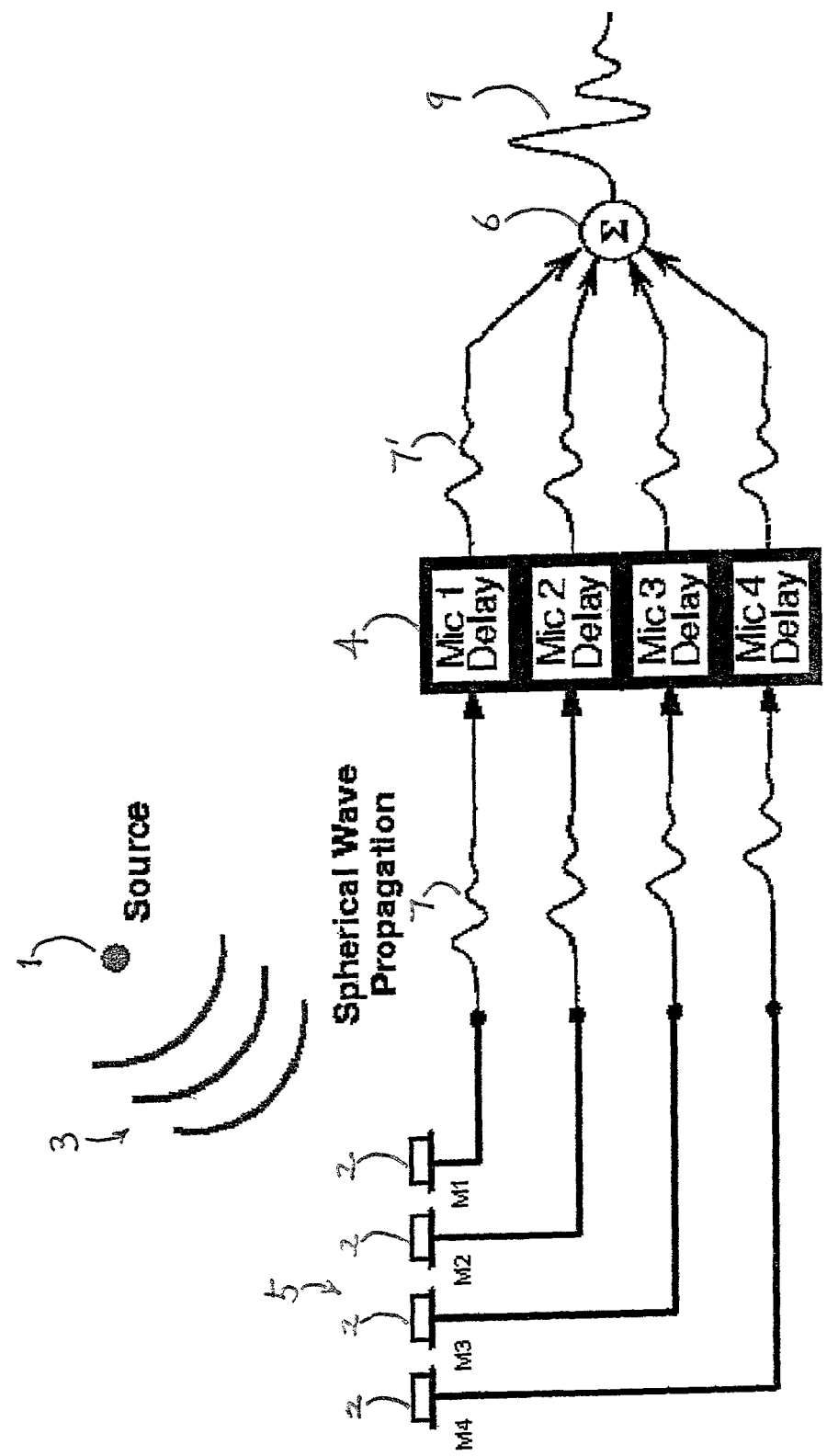
FIG. 1 schematically illustrates the principle of an acoustic array that can be utilized to practice the present invention.

Additionally, as used in the specification and in the claims, an acoustic array is a collection of spatially distributed microphones used to measure an acoustic field. The time signals from each microphone are selectively weighted and delayed through a signal processing technique known as beamforming. Beamforming provides the array with a directional response, which is electronically "steered" in space. As illustrated in FIG. 1, a monopole acoustic source 1 is radiating spherical waves 3 into a homogeneous quiescent medium fixed in space, where an acoustic array 5 is positioned. Each microphone 2 in the array 5 senses a slightly different phase-shifted waveform 7 depending on its distance from the source 1 due to propagation delay. The array 5 can be focused on the source 1 by phase shifting the microphones through phase shifting device 4 and then summing the output 7' from each microphone at a summation device 6, which in turn generates a signal 9 responsive to the acoustic wave 3. This process is commonly referred to as delay-and-sum beamforming. The beamforming technique permits the measurement of noise from predefined regions in space, while providing signal rejection for sources located outside of the acoustic beam.

Referring generally to FIGS. 2–23, in accordance with the purposes of this invention, as embodied and broadly described herein, this invention, in one aspect, relates to a combination responsive to an acoustic wave that can be utilized as a dynamic pressure sensor.

Figure 2:
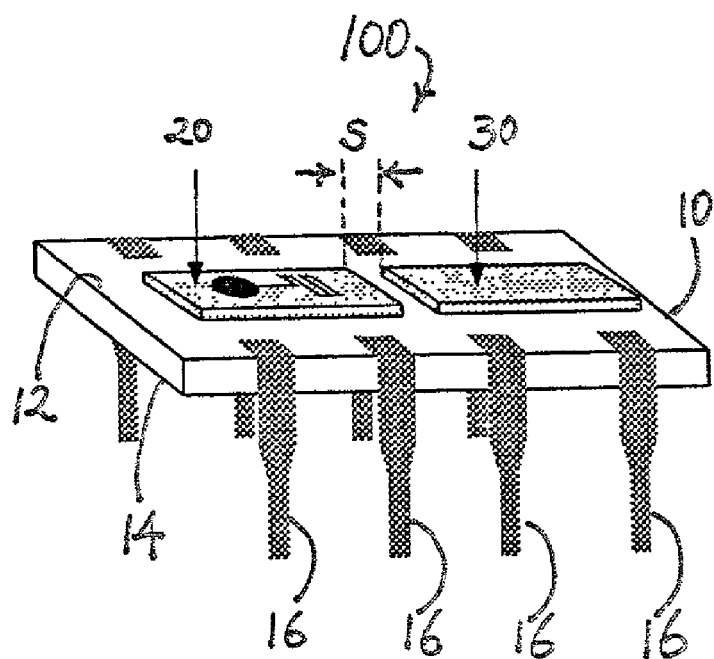
FIG. 2 shows an acoustic combination in the form of a standard integrated circuit according to one embodiment of the present invention.
Figure 3A:
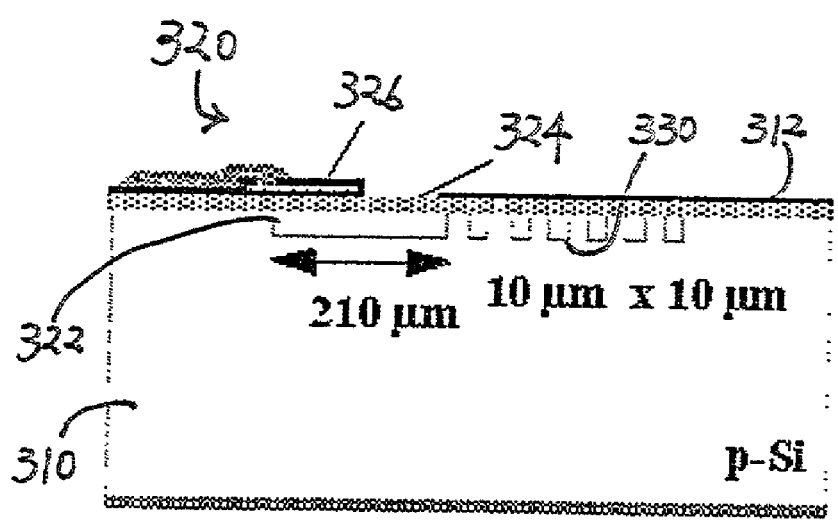
FIG. 3A shows a cross-sectional view of a microphone that can be utilized in the acoustic combination as shown in FIG. 2.
Figure 3B:
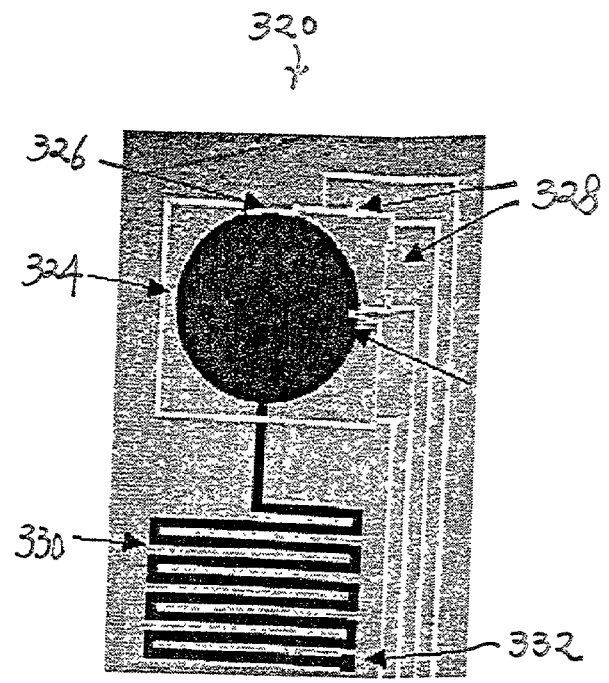
FIG. 3B shows a scanning-electron microscope (SEM) photograph of the microphone as shown in FIG. 3A.
Figure 4:
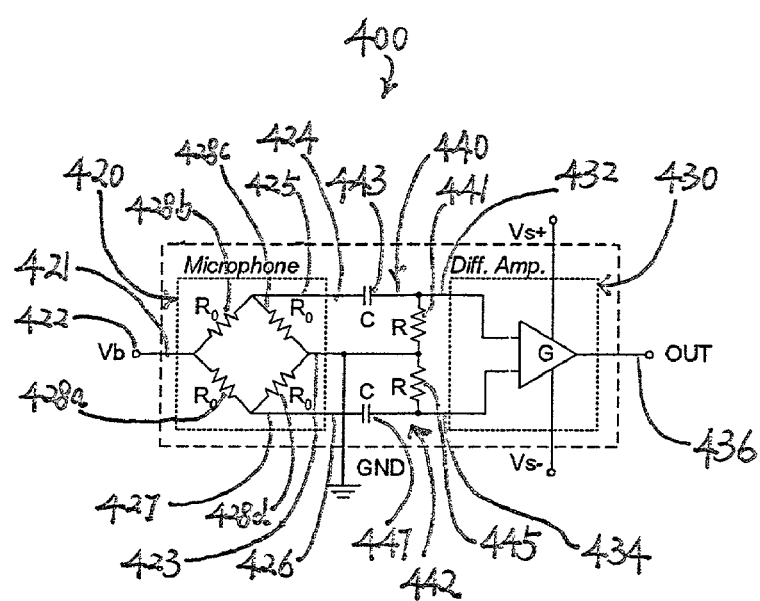
FIG. 4 shows a circuit schematic of the acoustic combination as shown in FIG. 2 in one embodiment of the present invention.

Referring first to FIGS. 2–4, in one embodiment of the present invention, a combination 100 in the form of a standard integrated circuit has a substrate 10 having a first surface 12 and an opposite second surface 14, a microphone 20 positioned on the first surface 12 of the substrate 12. In the embodiment as shown in FIG. 4, the microphone 420 having an input 422 and a first output 424 and a second output 426, wherein the input 422 receives a biased voltage $V_b$, and the microphone 420 generates an output signal responsive to the acoustic wave (not shown) between the first output 424 and the second output 426.

The combination 100 further has an amplifier 30 positioned on the first surface 12 of the substrate 10. In the embodiment as shown in FIG. 4, the amplifier 430 has a first input 432 and a second input 434 and an output 436, wherein the first input 432 of the amplifier is electrically coupled to the first output 424 of the microphone 420 and the second input 434 of the amplifier 430 is electrically coupled to the second output 426 of the microphone 420 for receiving the output signal from the microphone 420. As shown in FIG. 2, the amplifier 30 is spaced from the microphone 20 with a separation s that is smaller than 0.5 mm. This hybrid approach of a microphone and an amplifier in a combination permits optimization in design and fabrication of both the microphone and the associated circuitry in a standard IC package. Additionally, the close proximity of the amplifier 30 to the microphone 20 can reduce electromagnetic interference normally associated with cabling.

The substrate 10 comprises a semiconductor material such as silicon. The microphone 20 can be chosen from a variety of available microphones. All microphones are based on the electronic measurement of a pressure-induced structural deflection. The microphone is an electro-mechanical-acoustic transducer that transforms acoustical energy into electrical energy. Most commercial (non-MEMS) microphones employ capacitive sensing schemes. The implementation of a capacitive scheme in solid-state sensors requires on-chip electronics to minimize the effects of parasitic capacitance. The piezoresistive transduction scheme, which includes measuring the strain on the top surface of a deflected diaphragm is less expensive to develop, simpler to fabricate, and potentially more robust than a capacitive device. Furthermore, theoretical studies indicate that piezoresistive sensing schemes can transduce a lower minimum detectable pressure than capacitive schemes for diaphragm edge-lengths of less than 0.5 mm. These factors, along with concerns about environmental stability (e.g., condensation) and ease of fabrication, leads the inventors to select a piezoresistive sensing scheme in one embodiment of the present invention.

In one embodiment, the microphone can be a piezoresistive microphone 320 as shown in FIGS. 3A and 3B. The piezoresistive microphone 320 has a semiconductor substrate 310 having a cavity 322, a diaphragm 324 covering the cavity 322, and at least one piezoresistor 326 positioned on top of the diaphragm 324. In operation, when the cavity 322 receives the acoustic wave, the diaphragm 324 moves in response to cause stress in the piezoresistor 326, and the piezoresistor 326 generates an electric signal responsive to the acoustic wave. In addition to active resistors such as piezoresistor 326, one or more passive or ordinary resistors 328 may be electrically coupled to the piezoresistor 326. Piezoresistors 326 can be coupled in various configurations. For example, in one embodiment as shown in FIG. 4, the microphone 420 has four piezoresistors 428a–428d forming a Wheatstone bridge. Each piezoresistor 326 can be a single-crystal silicon piezoresistor and may be silicon-dioxide encapsulated to improve stability and reduce noise. In one embodiment, the piezoresistors are encapsulated in a silicon dioxide passivation layer to improve stability and reduce noise. Mobile ions in the passivation layer can drift over time. In addition, the surface of the passivation layer may become hydrated with water moisture that will change the surface potential. Changes in the surface potential and the mobile ion distribution may result in a temporal variation of the electric field at the piezoresistive silicon surface. This in turn may modulate the carrier concentration and change the resistance. Therefore, methods to reduce the mobile ion concentration and control the surface potential and properties are necessary for improved stability. Alternative dielectrics such as silicon nitride and other materials may improve resistance to moisture. The diaphragm 324 may be a silicon-nitride membrane.

The piezoresistive microphone 320 may further include a channel 330 in fluid communication with the cavity 322 and the ambient atmosphere. The channel 330 is positioned on the surface 312 of the semiconductor substrate 310 and terminated at one end with a vent hole 332 in fluid communication with the ambient atmosphere. The channel 330 is terminated at another end 324 in fluid communication with the cavity 322.

As an example and as shown in FIGS. 3A and 3B, the microphone 320 can be constructed according to the present invention to include 0.1 μm-thick, silicon-dioxide encapsulated, single-crystal silicon piezoresistors 326 on top of a 0.15 μm-thick, 210 μm-diameter silicon-nitride membrane 324 stretched over a 10 μm-deep cavity 322. As known for people skilled in the art, while specific values are given here for the thickness, diameter or other physical dimensions of the device as an example, other values can also be used to practice the present invention. Pressure equilibration is achieved by the winding vent channel 330 that is vented to the surface. This example produces devices with known material properties and strict geometry control (thickness and diameter). The use of dielectrically-isolated, single-crystal silicon piezoresistors offers the following advantages over polycrystalline silicon: the piezoresistive gauge factor of single-crystal silicon is larger than the gauge factor of polycrystalline silicon and monocrystalline silicon does not possess grain boundaries which lead to excessive 1/f noise. Therefore, monocrystalline devices can produce higher-sensitivity, lower-noise microphones.

Referring now to FIG. 4, the combination 400 includes a first high pass filter 440 electrically coupled between the first input 432 of the amplifier 430 and the first output 424 of the microphone 420, and a second high pass filter 442 electrically coupled between the second input 434 of the amplifier 430 and the second output 426 of the microphone 420. In operation, the output signal from the microphone 420 has a DC component and an AC component, and the first and second high pass filters 440, 442 substantially block the DC component and allow the AC component of the output signal from the microphone 420 to pass, thereby to allow the amplifier 430 to generate a low impedance signal at the output 436. The first high pass filter 440 and the second high pass filter 442 each can be an RC pair circuit, a filter or the like.

Still referring to FIG. 4, in this embodiment, the microphone 420 comprises four piezoresistors 428a, 428b, 428c and 428d forming a Wheatstone bridge that has a first arm 421, an opposing second arm 423, a third arm 425, and an opposing fourth arm 427. The first arm 421 is electrically coupled to the input 422 of the microphone 420, the opposing second arm 423 is electrically coupled to ground, the third arm 425 is electrically coupled to the first input 432 of the amplifier 430, and the opposing fourth arm 421 is electrically coupled to the second input 434 of the amplifier 430. The amplifier 430 can be a preamplifier. The first high pass filter 440 comprises a resistor 441 and a capacitor 443, the capacitor 443 being electrically coupled in series between the third arm 425 of the Wheatstone bridge and the first input 432 of the amplifier 430, and the resistor 441 being electrically coupled in parallel between the second arm 423 of the Wheatstone bridge and the capacitor 443. Moreover, the second high pass filter 442 comprises a resistor 445 and a capacitor 447, the capacitor 447 being electrically coupled in series between the fourth arm 427 of the Wheatstone bridge and the second input 434 of the amplifier 430, and the resistor 445 being electrically coupled in parallel between the second arm 423 of the Wheatstone bridge and the capacitor 447. The resistor 441 of the first high pass filter 440 and the resistor 445 of the second high pass filter 442 are jointly coupled to the second arm 423 of the Wheatstone bridge. In this embodiment, the resistor 441 of the first high pass filter 440 and the resistor 445 of the second high pass filter 442 are substantially identical to each other. For example, each of them can be a low profile surface mount resistor. Each of them can have different or same physical shapes such as an arc resistor, a tapered resistor or the like. The capacitor 443 of the first high pass filter 440 and the capacitor 447 of the second high pass filter 442 are substantially identical to each other as well. For example, each of them can be a low profile surface mount capacitor. In this embodiment, the resistor 441 and the capacitor 443 form a first RC pair, and the resistor 445 and the capacitor 447 form a second RC pair.

The semiconductor substrate 10 comprises a silicon layer, which can be passivated with silicon dioxide. The combination 100 may further comprise a plurality of conductive leads 16 for interconnecting corresponding components positioned on the layer 10.

Figure 5A:
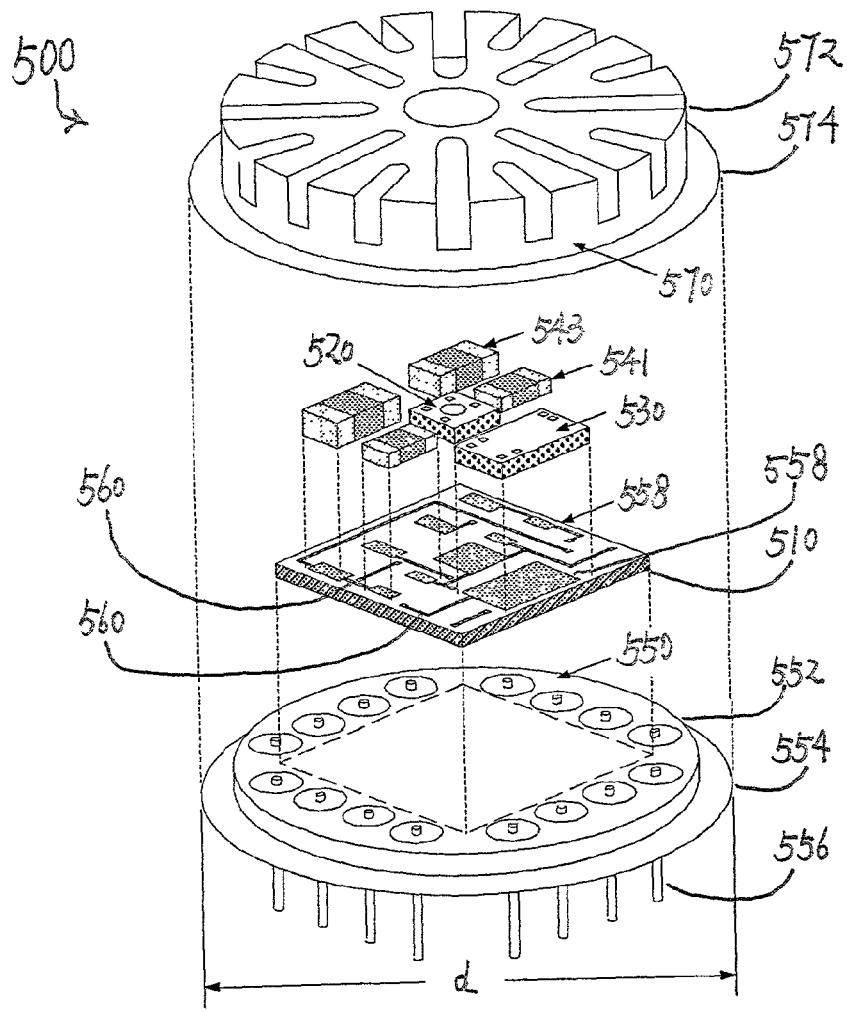
FIG. 5A shows an exploded schematic of an acoustic combination in the form of a hybrid microphone-amplifier packaging scheme according to one embodiment of the present invention.
Figure 5B:
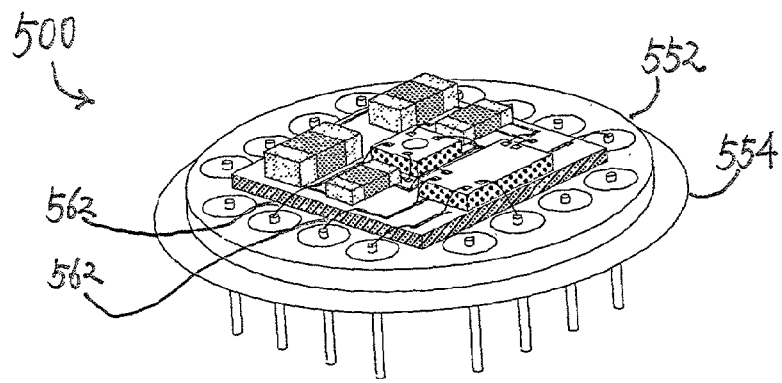
FIG. 5B partially shows a perspective schematic of an acoustic combination in the form of a hybrid microphone-amplifier packaging scheme according to one embodiment of the present invention as shown in FIG. 5A, where the components are wire-bonded.

Referring now to FIGS. 5A and 5B, a combination 500 responsive to an acoustic wave according to one embodiment of the present invention comprises a package 550 positioned underneath the semiconductor substrate 510. In one embodiment, the package 550 has a body 552 for supporting the semiconductor substrate 510, and a plurality of pins 556, each pin being conductive and penetrating through the body 556. The package 550 further has a peripheral portion 554 extending away from the package body 552. The dimension of the package may be characterized by a diameter d. In one embodiment, the diameter d is chosen to have a value about 0.60 in. The body 556 is electrically coupled to ground for electromagnetic shielding. The combination 500 further has a plurality of metal bond pads 558 for receiving components positioned on the silicon layer 510, and a plurality of conductive traces 560 for interconnecting corresponding metal bond pads 558. The combination 500 can additionally have a plurality of metal wire bonds 562, wherein each metal wire bond 562 may make an additional electrical coupling to the corresponding metal bond pads 558 and the pins 556. Each metal wire bond 562 may be a gold wire bond.

The combination 500 further has a lid 570 positioned above the semiconductor substrate 510. The lid 570 includes a body 572, and a peripheral portion 574 extending away from the body 572. The lid body 572 is complementarily sized such that when the lid 570 is positioned over the semiconductor substrate 510, the peripheral portion 574 of the lid 570 matches to and supported by the peripheral portion 554 of the package 550, and the body 572 covers the semiconductor substrate 510 and components positioned on the semiconductor substrate 510. The lid 570 may be made from a material that is substantially transparent to the acoustic wave. Additionally, the lid 570 is electrically coupled to ground for electromagnetic shielding.

Figure 6:
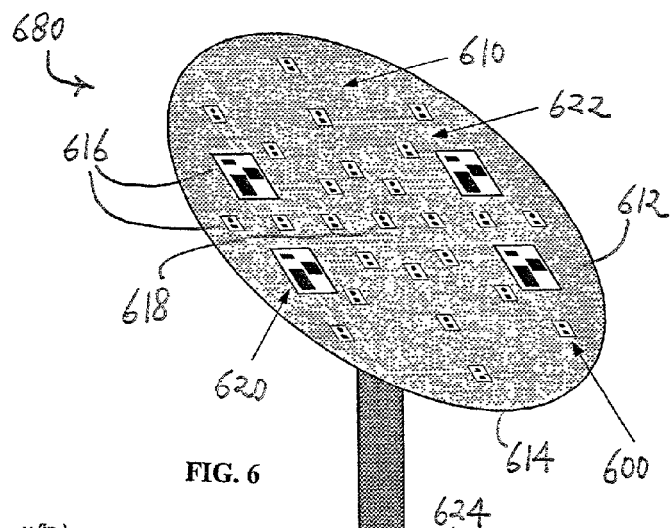
FIG. 6 shows a perspective schematic of an acoustic combination in the form of a printed circuit board array according to one embodiment of the present invention.

In another aspect, the present invention relates to a printed circuit board array responsive to an acoustic wave. Referring now to FIG. 6, in one embodiment, the printed circuit board array 680 includes a printed circuit board 610 having a first surface 612 and an opposing second surface 614, a plurality of sockets 616 distributed over the first surface 612 of the printed circuit board 610, a laser diode 618 positioned on the first surface 612 of the printed circuit board 610 for aiming the printed circuit board array 680 toward to the acoustic wave, and a plurality of microphone packages 600. Each microphone package 600 is complimentarily sized and received in a corresponding socket 616 and contains at least one microphone responsive to the acoustic wave and substantially like the combination 100, the combination 500 or the like of the present invention. Additionally, the printed circuit board array 680 may have one or more signal processing chips 620 for on board signal processing. The printed circuit board array 680 may have a support 624 to support the printed circuit board 610. The support 624 may be adjustable for height as well orientation.

Figure 7A:
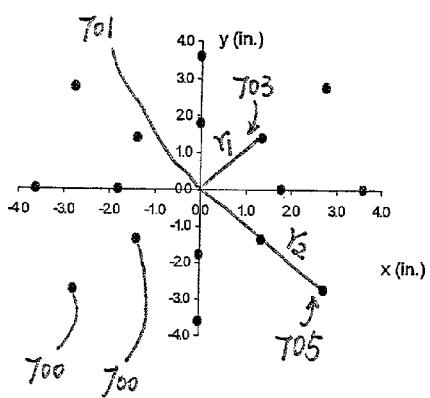
FIG. 7A shows a partial plot of array layout that can be utilized for the acoustic combination in the form of a printed circuit board array as shown in FIG. 6 according to one embodiment of the present invention.
Figure 7B:
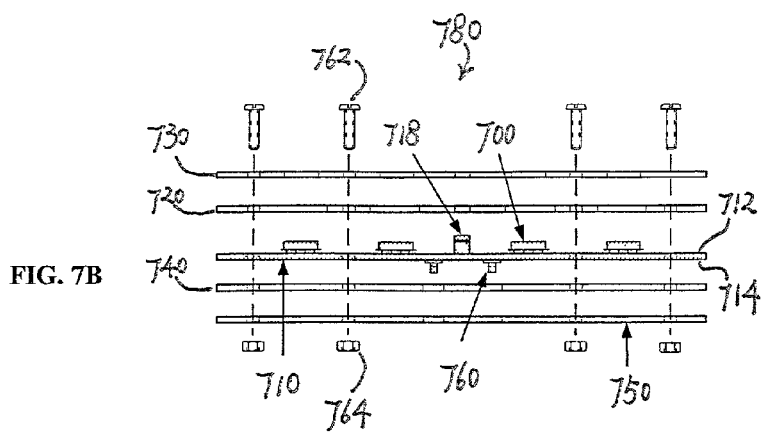
FIG. 7B shows a cross-sectional view of the partial array layout according to FIG. 7A that can be utilized for the acoustic combination in the form of a printed circuit board array as shown in FIG. 6 according to one embodiment of the present invention.

Referring now to FIGS. 7A and 7B, a printed circuit board array 780 may further include at least one SMB-type coaxial cable connector 760 positioned on the second surface 714 of the printed circuit board 710. Moreover, the printed circuit board array 780 has at least one support layer 720 positioned above the first surface 712 of the printed circuit board 710, and at least one support layer 740 positioned below the second surface 714 of the printed circuit board 710. Additional support layers 720, 750 may also be utilized. Each of the support layers may comprise a garolite stiffening layer, which may be bonded to the printed circuit board 710 through, for example, bolts 762 and corresponding nuts 764.

The printed circuit board 710 may comprise a double-sided copper clad. In the embodiment as shown in FIGS. 7A and 7B, the printed circuit board has a center 701, and the plurality of microphone packages 700 are distributed over the first surface 712 of the printed circuit board 710 along a plurality of concentric rings 703, 705. Note that although only a two-ring configuration is shown, configurations have less or more rings can also be utilized to practice the present invention. Each ring has a radius measured from the center 700 of the printed circuit board 710 different from the radius of any other ring. For example, ring 703 has a radius $r_1$ that is different from $r_2$ of ring 705. An equal or unequal number of the microphone packages 700 are distributed over each ring, wherein each microphone package 700 has at least one microphone responsive to the acoustic wave and at least one amplifier coupled to and spaced from the microphone with a separation smaller than 0.5 mm as discussed above. The printed circuit board 710 may also have a controller (not shown) for data processing.

Figure 8:
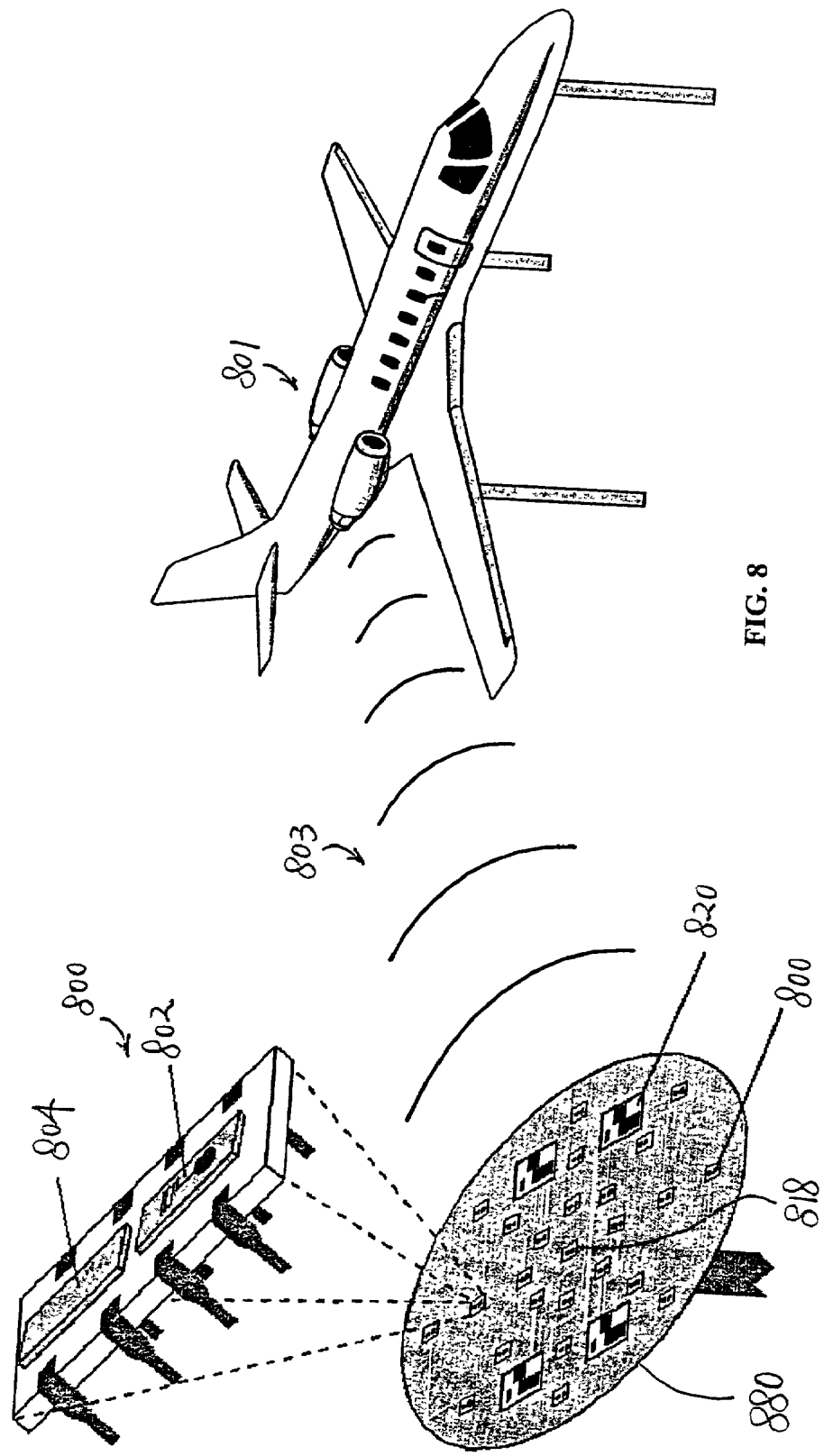
FIG. 8 shows schematically an application of the acoustic combination in the form of a printed circuit board array according to one embodiment of the present invention as shown in FIG. 6.

The printed circuit board array 680 or 780 can be utilized for aeroacoustic measurements for airframe noise mechanism identification and source localization. As shown in FIG. 8, an airplane 801 is radiating spherical waves 803, which is received by an acoustic array 880 of the present invention. Each microphone 802 in the array 880 senses a slightly different phase-shifted waveform and generates a signal responsive to the acoustic wave 803. The signal is amplified by each corresponding amplifier 804. The total signal can be further processed by processing chip(s) 820. Laser diode 818 may aim the acoustic array 880 more accurately to the airplane 801.

The invention will be better understood by reference to the following illustrative samples and corresponding testing results, which are constructed and performed according to the present invention.

Hybrid Microphone-Amplifier Packages

A hybrid microphone-amplifier package scheme combines a micromachined piezoresistive silicon microphone and an Analog Devices AD624 low-noise differential amplifier into a 16-pin, 0.6" TO-8 semiconductor package. The differential outputs of the microphone Wheatstone bridge are AC-coupled to the inputs of the amplifier via two resistor-capacitor (RC) pairs as shown in FIG. 4, with a cut-on frequency given by, $f_c=1/(2\pi RC) = 1.6$ Hz. This hybrid package provides a small, self-contained microphone module with an amplified, low-impedance output. The sensor packages are fitted into sockets on a printed circuit board array, permitting external calibration and interchangeability. In this embodiment, related parameters are chosen as $R_0 \approx 600$ Ω, $R=147$ kΩ, $C=0.68$ μF, $G=500$, $V_b=3$ V, $V_s=\pm 10$ V.

The construction of the hybrid package including four layers as shown in FIGS. 5A and 5B: the package body, a silicon substrate, the component layer, and a protective lid. A TO-8 "can" package serves as a primary structural element. A silicon substrate is bonded to the can body using conductive silver epoxy. The substrate, passivated with silicon dioxide, provides metal bond pads and interconnecting traces for the devices. The components are bonded to the exposed bond pads of the silicon substrate using conductive silver epoxy. Gold wire bonds are used to make additional electrical connections to the chip bond pads and package pins. A slotted lid provides protection against physical damage while permitting acoustic waves to pass. The can body and lid are connected to the circuit ground for additional electromagnetic shielding.

Printed Circuit Board Array

An illustrative array of the invention has 16 microphones arranged as partially shown in FIGS. 7A and 7B. The planar layout has four concentric rings with radii 1.80", 1.94", 3.60", and 3.89", each having four microphones. The array is constructed from a double-sided copper clad PCB that serves as the electrical interface and mechanical structure. The top surface of the PCB contains the 16 microphone packages and a laser diode to permit accurate aiming of the array. The bottom surface contains SMB connectors for the coaxial cabling. Four layers of garolite are milled and through-bolted to the circuit board array to provide additional rigidity.

Signal Processing

The signal processing involves continuously sampling data from the array, computing the Fast Fourier Transform (FFT) on blocks of data, and using conventional frequency-domain beamforming methods to obtain the array pressure response over a scanned region in space.

An Agilent E1432A 16-channel, 16-bit, VXI-based digitizer is used to acquire the signals from the array. The digitizer is interfaced to a host computer (866 MHz Pentium III, 256 MB RAM) via a National Instruments MXI-2 interface bus. The host controls the operation of the digitizer, runs the beamforming algorithms, and displays and saves the results using MATLAB v.6.0. In operation, the digitizer samples all 16 channels with 16-bit resolution at a sampling rate of 25.6 kHz. The Agilent E1432A provides the capability to perform real-time Fast Fourier Transforms (FFT's) on the incoming data, significantly reducing the computational load on the host computer. A Hanning window is used in computing 1024-point FFT's, yielding a frequency resolution of 25 Hz. The digitizer internally compensates for the power lost in the windowing operation by scaling the output by the Hanning window weighting factor of $\sqrt{8/3}$. Typically 400 non-overlapping blocks are used, corresponding to 16 sec of time data.

The cross-spectral matrices for all 512 bin frequencies are computed in real time for each successive block of FFT data that is transferred to the PC host. The time-averaged cross-spectral matrices are obtained by, $$\hat{R}_k = \frac{1}{L} \sum_{l=1}^{L} Y_{kl} Y'_{kl}$$

where vector $Y_k$ is a column vector containing the $k^{th}$ FFT coefficients for all M channels, $$Y_k = \begin{bmatrix} Y_{1_k} \\ \vdots \\ Y_{M_k} \end{bmatrix}.$$

The data is converted to units of pressure squared ($Pa^2$) by dividing by the square of the microphone sensitivity. The array power response is obtained using $$\hat{P}_k = e'_k \hat{R}_k e_k$$

where the quantity $e_k$, known as the steering vector, contains the weights and phase shifts to be applied to the system and is given by $$e_k = \begin{bmatrix} w_1 e^{j\omega_k \Delta_1} \\ \vdots \\ w_M e^{j\omega_k \Delta_M} \end{bmatrix}.$$

The weights and phase shifts are given by $$w_m = \frac{r_m}{r},$$

$$\Delta_m = \frac{r - r_m}{c},$$

where r and $r_m$ are the radial distances from the focus location to the array center and the $m^{th}$ microphone, respectively, and c is the speed of sound. The array power response is divided by the number of microphones squared ($M^2$) to normalize the array output to that of a single microphone. The pressure response is given by the square root of this result. For most of the measurements made in calibrating the array, a 48 in.×48 in. grid of regularly spaced (1 in. increments) focal locations are used in a scan plane parallel to the array face at a distance of 36 in. The pressure response computation time for a single frequency bin is under 4 sec. The time-averaged cross-spectral matrices for all 512 frequency bins are stored to disk, resulting in file size of 2 MB.

Experimental Results

The experimental methodologies and results for calibrations of the hybrid package and array system according to one embodiment of the present invention are presented. The frequency responses of the hybrid microphone packages are obtained using a plane wave tube acoustic calibrator. Characterization of the array system is performed using an acoustic point source in an anechoic chamber.

Hybrid Package Calibration

Figure 9:
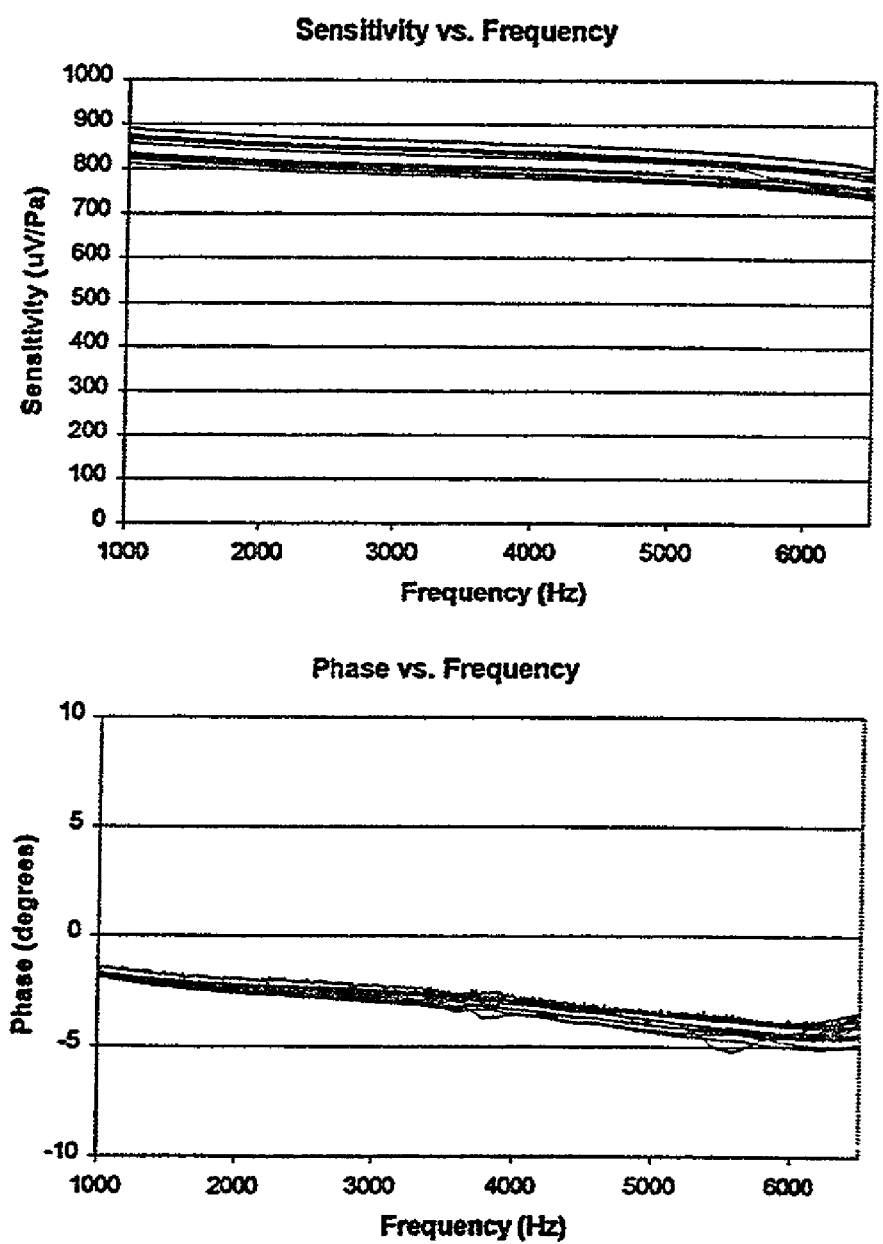
FIG. 9 shows magnitude (top portion) and phase response (bottom portion) of a 16 hybrid packages at about 110 dB SPL (re 20 µPa) according to one embodiment of the present invention, respectively.
Figure 10:
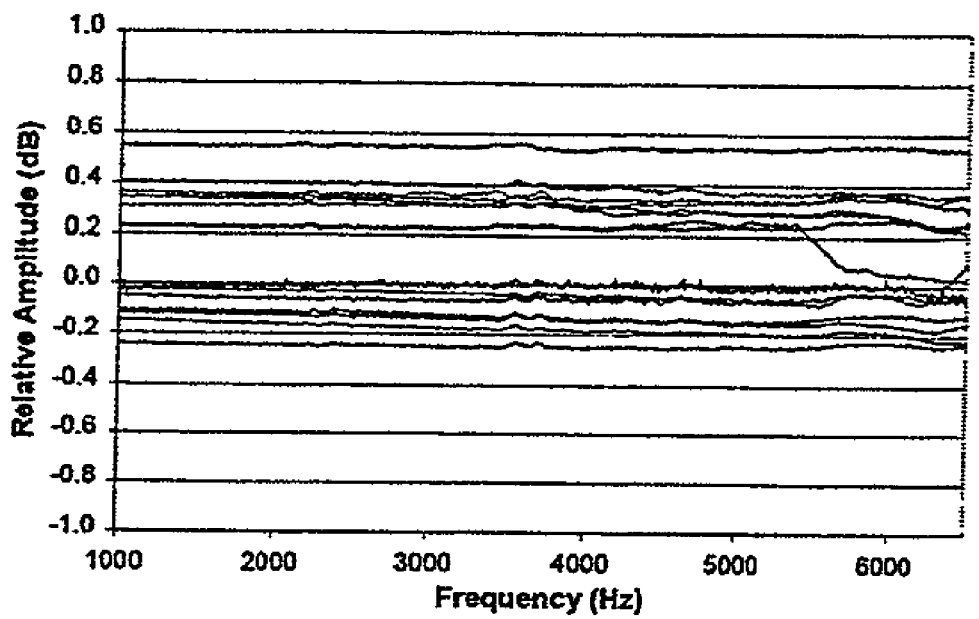
FIG. 10 shows relative magnitude (top portion) and phase response (bottom portion) of a 16 hybrid packages according to one embodiment of the present invention, respectively.
Figure 10:
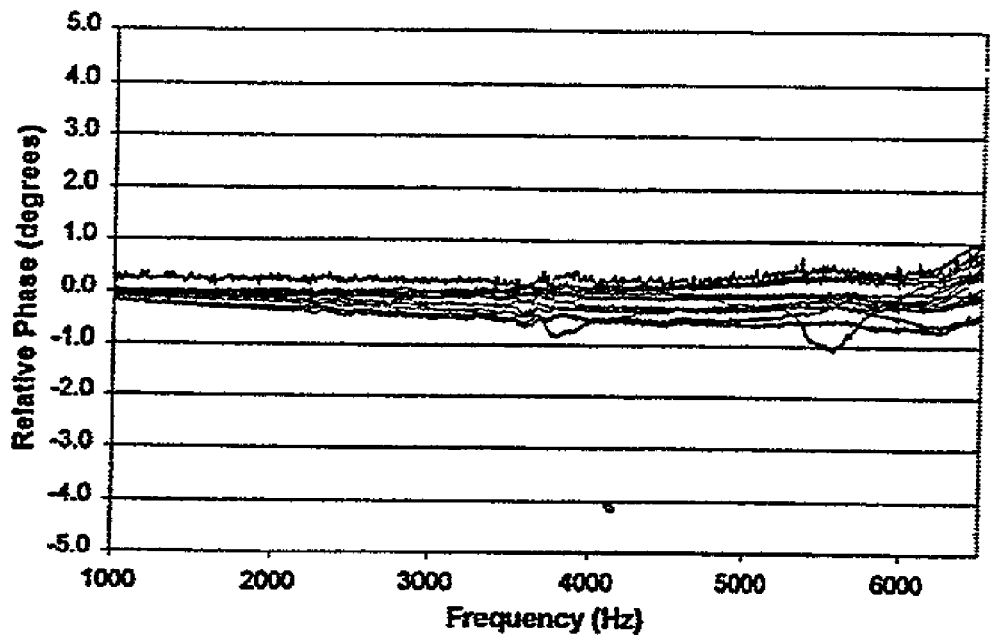
Figure 11:
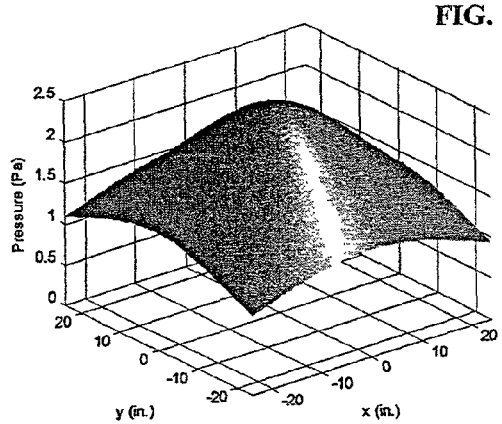
FIG. 11 shows measured array pressure response (left portion) and contour plot (right portion) at 2 kHz for a 48 in.×48 in. scan plane at 36 in. for a hybrid packages according to one embodiment of the present invention, respectively.
Figure 11:
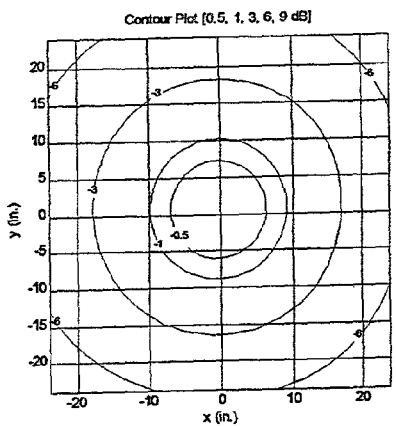
Figure 12:
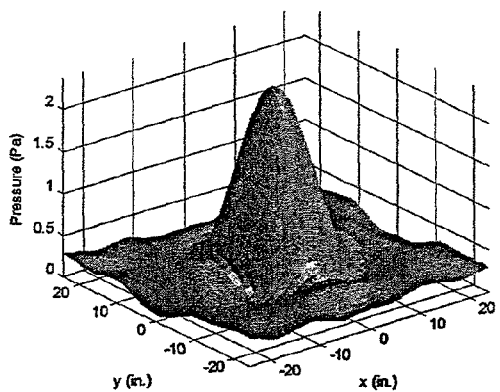
FIG. 12 shows measured array pressure response (left portion) and contour plot (right portion) at 6 kHz for a 48 in.×48 in. scan plane at 36 in. for a hybrid packages according to one embodiment of the present invention, respectively.
Figure 12:
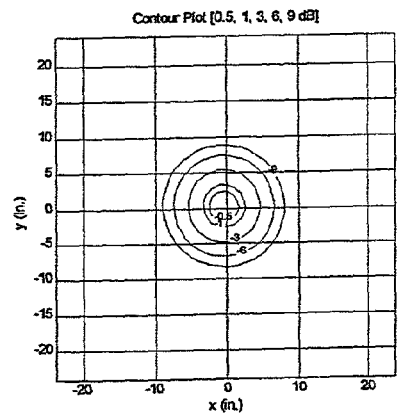
Figure 13:
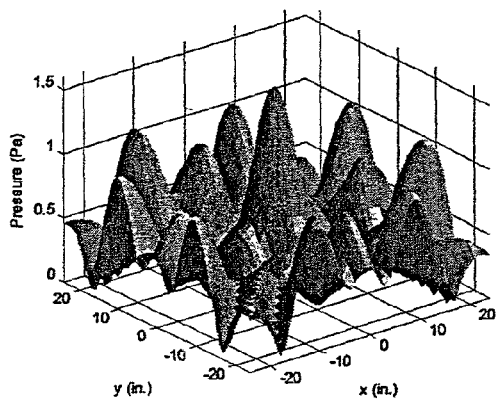
FIG. 13 shows measured array pressure response (left portion) and contour plot (right portion) at 10 kHz for a 48 in.×48 in. scan plane at 36 in. for a hybrid packages according to one embodiment of the present invention, respectively.
Figure 13:
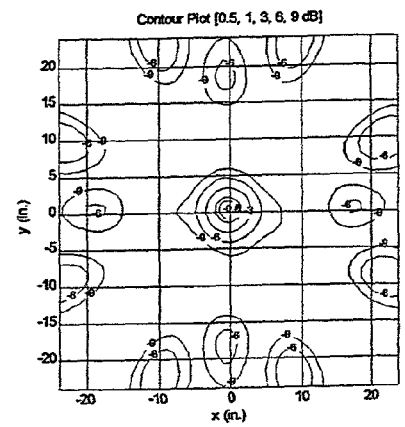

Each hybrid microphone package is operated individually for amplitude and phase using a 1"×1" square cross-section, normal incidence plane wave tube, designed to support plane waves up to 6.7 kHz. The microphone package and a ⅛-inch Bruel and Kjaer (B&K) 4138 reference microphone are flush mounted at the terminating end of the tube and subjected to normally incident plane waves. The frequency response of the hybrid package is determined with respect to the B&K microphone. The frequency response calibrations for the sixteen hybrid packages are shown in FIG. 9. The average measured sensitivity of each hybrid package over the frequency range of 1 kHz–6.5 kHz is shown to vary from 780 μV/Pa to 855 μV/Pa. The mean sensitivity for all sensors over the frequency range tested is 831 μV/Pa. The linear trend in the phase response could be a phase variation but may also be attributed to a mounting error in the PWT calibration. An axial offset in the position in the PWT of the reference microphone and test microphone will result in a linear bias in the phase measurement. An offset of only 1 mm would result in a phase bias error of 6.25 degrees at 6 kHz.

For the purposes of array signal processing, the relative magnitudes or phases between sensor packages are important. The frequency response data is reformatted and shown in FIG. 10 as a relative magnitude and phase with respect to microphone #1. The magnitude responses of all microphones are shown to match within ±0.6 dB, and the phase responses are matched within ±1 degree over the frequency range tested. Mosher states that phase matching within ±10 degrees is sufficient for obtaining reasonable results without the need for phase corrections. Therefore, the hybrid microphone packages are considered acceptable for use in the array and all of the array calibrations are presented from uncorrected, raw measurements.

Array Calibration

The array response to an acoustic point source was measured in an anechoic chamber, having a 100 Hz cutoff frequency, as a function of source frequency, source amplitude, and source location. Each measured response was compared to the theoretical response (array pattern) given by, $$W(\omega, \vec{x}, \vec{x}') = \sum_{m=1}^{M} \frac{r_m}{r} \frac{r'}{r'_m} \exp\left\{j\omega\left[\frac{(r'-r)-(r'_m-r_m)}{c}\right]\right\},$$

where the "primed" terms represent the radial distances from the actual source (located at $\vec{x}'$) and the "unprimed" terms represent the radial distances from the focus location (located at $\vec{x}$). The acoustic point source, provided by NASA Langley, consists of a JBL 2426J-compression driver mated to a 21 in. long, 0.75 in. inner diameter metal pipe. The pressure field generated by the device is modeled as a piston at the end of a pipe and performs suitably as a point monopole for frequencies below 11.5 kHz.

Several metrics were used to quantify the differences between the measured and theoretical responses. For this analysis, the measured array response is normalized by its peak value for direct comparison to the normalized array pattern. The first metric is comparison of the beamwidths of the mainlobe at 0.5 dB, 1 dB, 3 dB, 6 dB, and 9 dB down from the peak values. Because the mainlobe may not have cylindrical symmetry, an equivalent beamwidth is used. It is obtained by computing the diameter of a circle having the same area as enclosed by the respective contour curve. The second metric is to compute a weighted root mean squared (RMS) error for the measured response. It provides an estimate of the total relative error over K scan locations and is expressed, $$\text{weighted\_error}_{\text{RMS}} = \sqrt{\frac{\sum_{k=1}^{K} M_k(T_k - M_k)^2}{K}},$$

where $T_k$ and $M_k$ represent the normalized theoretical and measured responses at the $k^{th}$ scan location, respectively. The error is weighted by the measured response $M_k$ to account for the relative effect the errors would have in the measured response. A third metric is to compare the location of the measured peak response to the actual source location.

Array Response vs. Frequency

The array response was first examined as a function of frequency for a point source positioned at a distance of 36 in. on the z-axis of the array. Discrete tones were used to achieve an average sound pressure level of approximately 100 dB SPL at the array microphones. The measured array pressure responses are shown at 2 kHz, 6 kHz, and 10 kHz in FIGS. 11–13.

Figure 14:
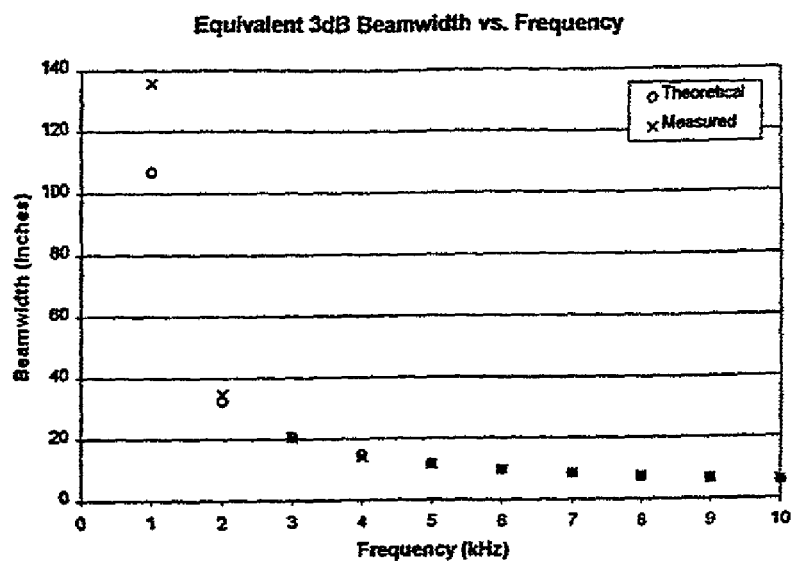
FIG. 14 shows theoretical and measured 0.5 dB beamwidths vs. frequency for source at 36 in. for a hybrid packages according to one embodiment of the present invention.
Figure 15:
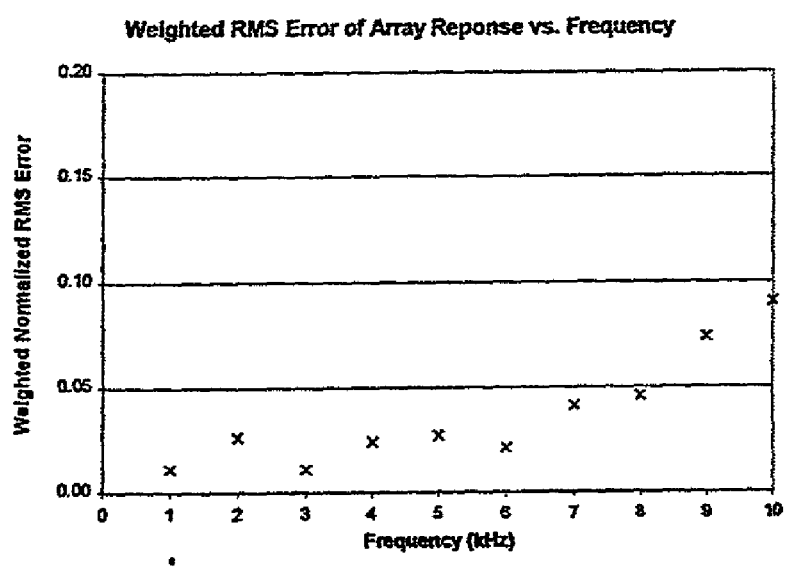
FIG. 15 shows weighted RMS error as a function of frequency for a 48 in.×48 in. scan plane at 36 in. for a hybrid packages according to one embodiment of the present invention.

The equivalent 3 dB mainlobe beamwidth is shown in FIG. 14 for frequencies from 1 kHz to 10 kHz. This data is representative of the results obtained for the equivalent 0.5, 1, 6, and 9 dB beamwidths. The measured beamwidths are shown to closely match the theoretical values for frequencies of 3 kHz and higher. Verification of the mainlobe beamwidth is important from a spatial resolution standpoint, but does not address the remainder of the response, particularly the effect of sidelobes. A measure of the total error is given by the weighted RMS errors as shown in FIG. 15. The error remains below 5% up to 8 kHz before increasing to a maximum of 9% at 10 kHz. Diffraction at the end of a cylinder becomes significant for values of kd larger than 1 or 2, where k is the acoustic wavenumber and d is the radius of the disk. It is noted that for the 0.6 in. package, kd=2 at approximately 7.2 kHz, and this may explain the increase in error above that frequency.

Array Response vs. Sound Pressure

One benefit of an acoustic array is its improvement in the signal to noise ratio of the measured signal, referred to as the array gain. The use of multiple microphones enables the measurement of source signals that are below the noise floor of any one particular microphone. Thus, an important characteristic of an array is its performance as a function of incident sound pressure, or equivalently the signal to noise ratio of the microphones. For this experiment, the point source is fixed on the boresight of the array at a distance of 36 in. and the array response to a 6 kHz tone is measured at various sound pressure levels. As a reference, the array was removed and a single B&K 4138 microphone was used to measure the free-field sound pressure level at the location of the array origin for several sinusoidal voltage amplitudes supplied to the speaker. The array was then reinstalled and the responses were measured using the calibrated speaker voltage inputs.

Figure 16:
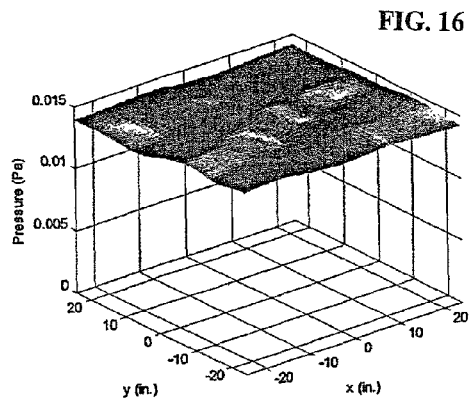
FIG. 16 shows measured array pressure response (left portion) and contour plot (right portion) at 6 kHz for free field pressure of 44.7 dB SPL (noise floor) for a hybrid packages according to one embodiment of the present invention, respectively.
Figure 16:
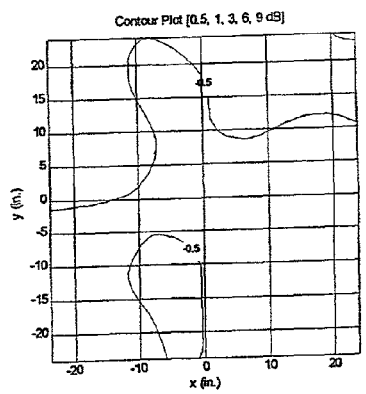
Figure 17:
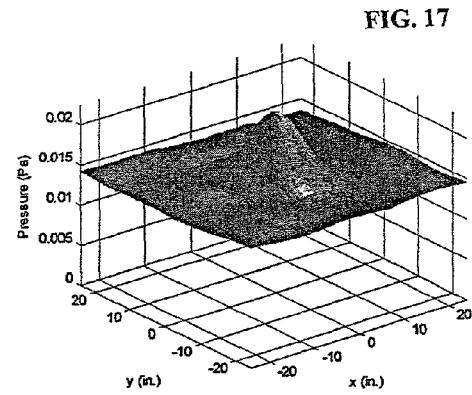
FIG. 17 shows measured array pressure response (left portion) and contour plot (right portion) at 6 kHz for free field pressure of 54.7 dB SPL (noise floor) for a hybrid packages according to one embodiment of the present invention, respectively.
Figure 17:
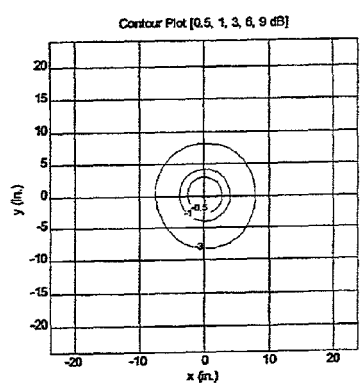
Figure 18:
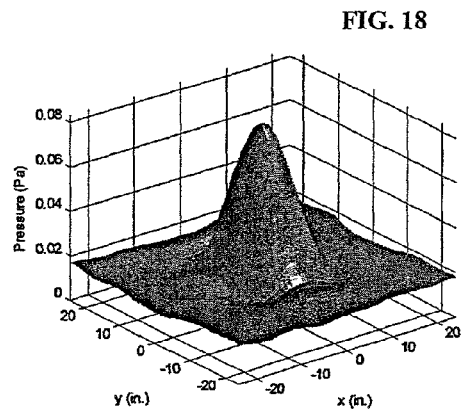
FIG. 18 shows measured array pressure response (left portion) and contour plot (right portion) at 6 kHz for free field pressure of 68.1 dB SPL (noise floor) for a hybrid packages according to one embodiment of the present invention, respectively.
Figure 18:
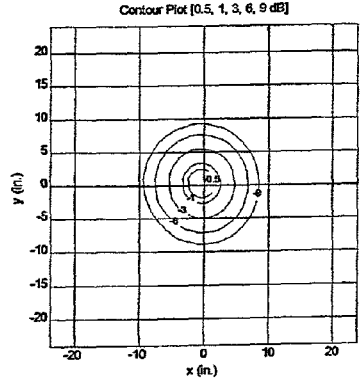
Figure 19:
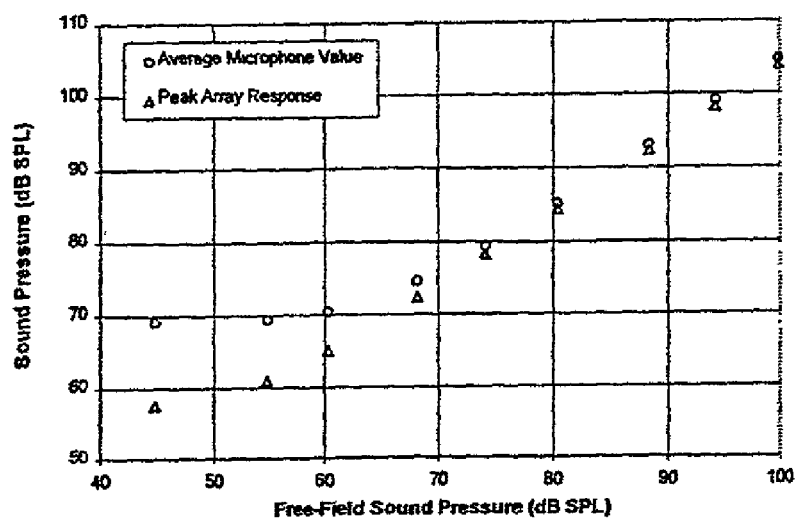
FIG. 19 shows average array microphone pressure an d peak array response pressure vs. free-field pressure at 6 kHz for a hybrid packages according to one embodiment of the present invention.
Figure 20:
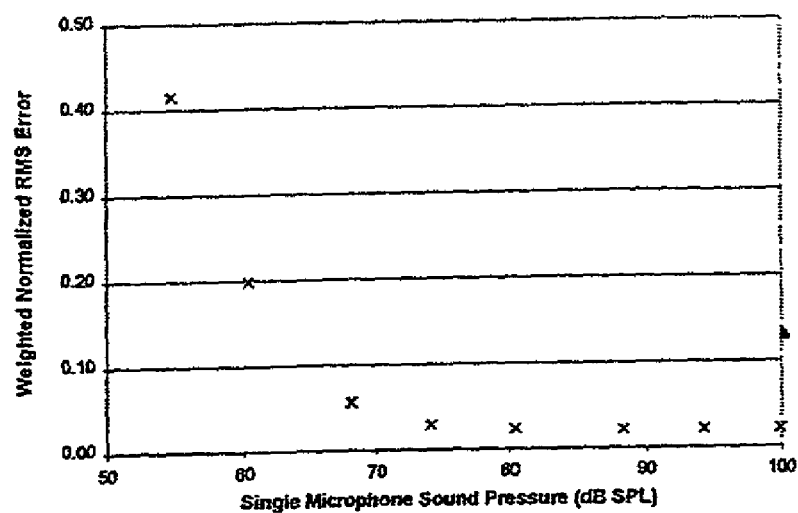
FIG. 20 shows weighted RMS error as a function of free-field sound pressure for a 6 kHz source located at 36 in. for a hybrid packages according to one embodiment of the present invention.

FIGS. 16–18 show the array response at several increasing source amplitudes, respectively. The array response appears to "grow" out of the noise floor. FIG. 19 shows the average microphone pressure and the peak array pressure vs. the free-field pressure measured by the single B&K microphone. For a strong, tonal point source, the free field pressure, the average microphone pressure, and the peak array pressure should all be equal. At higher sound pressure levels, the average microphone pressure and peak array pressure converge to within 1 dB, but there is an offset of approximately 5 dB between these values and the free-field value. A 3 dB increase could be explained as a pressure doubling due to a sound hard boundary condition at the face of the array. The additional amplification may be due to additional diffraction effects and/or variations in the sensitivity of the devices. Regardless of the absolute levels, the lower end of the curve illustrates the existence of the array gain. As the incident sound pressure level decreases, the average microphone response asymptotes to 69.1 dB SPL while the peak array response asymptotes to 57.5 dB SPL. Thus, the array can effectively detect a source that is 11.6 dB SPL below the noise floor of the individual microphones. The asymptotic values represent the minimum detectable signals for a 25 Hz bin at 6 kHz. The estimated noise floors for a 1 Hz bin at 6 kHz are 55.1 dB SPL for the hybrid packages and 43.5 dB SPL for the array. Maximum sound pressure levels of at least 160 dB SPL are achievable. FIG. 20 shows the weighted RMS error as a function of the free field pressure. The curve shows the error decreasing as the incident sound pressure converging to within 1% of its final value at a free-field pressure of 74 dB SPL.

Array Response vs. Location

Figure 21:
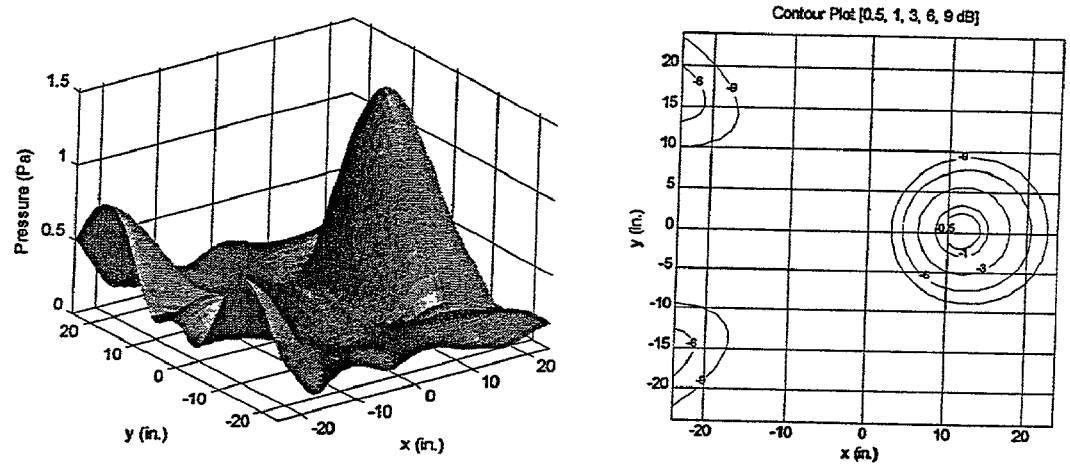
FIG. 21 shows measured array pressure response (left portion) and contour plot (right portion) for a 6 kHz source located at (12 in., 0 in., 36 in.) for a hybrid packages according to one embodiment of the present invention, respectively.
Figure 22:
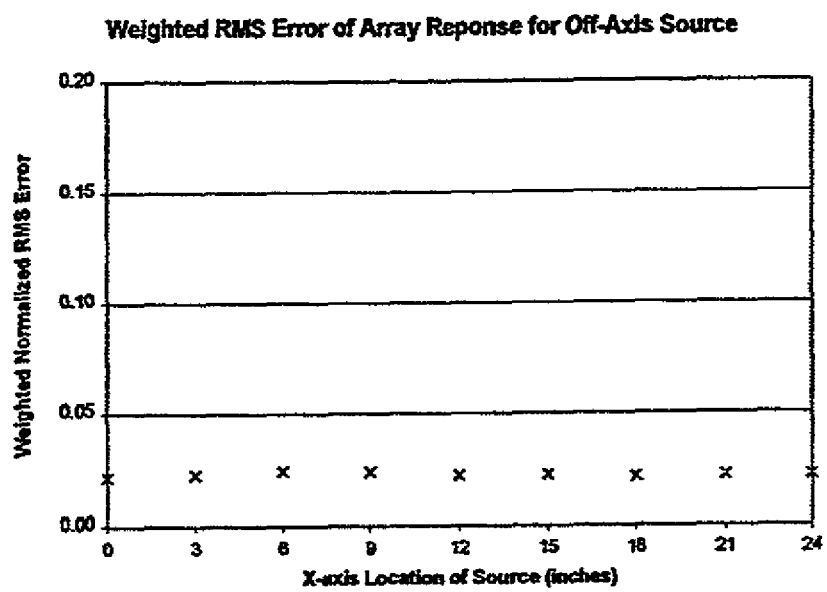
FIG. 22 shows absolute spatial error (in inches) in the peak response of the array for a 6 kHz source for a hybrid packages according to one embodiment of the present invention.

Perhaps one of the most useful aspects of a directional array is its capability for source localization. As a one-dimensional verification, a 6 kHz source at a distance of 36 in. is translated in the x-direction in 3 in. increments to a distance of 24 in., and the performance of the array was examined. Ideally, the array response should be calibrated over a broad range of locations in space. FIG. 21 shows an example response for the source 12 in. along the x-axis. FIG. 22 shows the weighted RMS error for the array response as a function of the x-location. The error remains constant at approximately 2.5% over the range tested.

Figure 23:
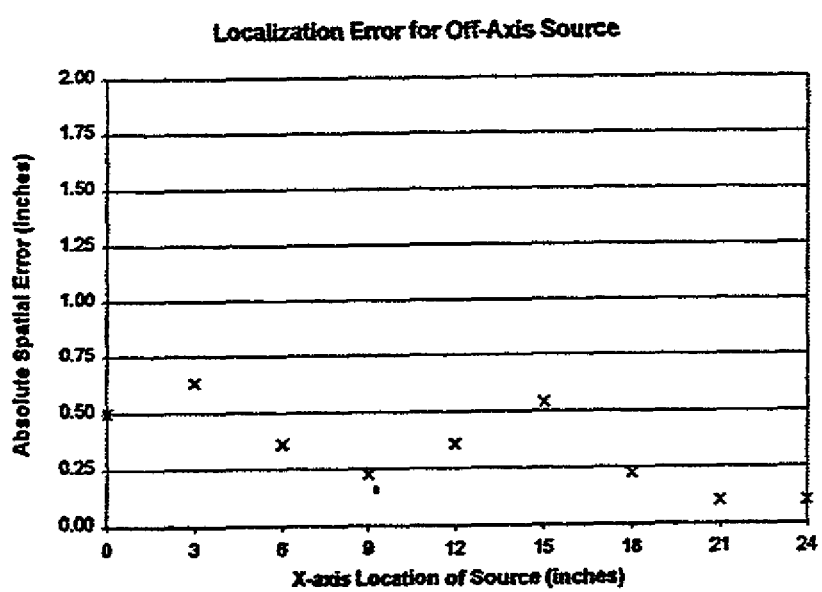
FIG. 23 shows weighted RMS error at 6 kHz as a function of source x-location for a hybrid packages according to one embodiment of the present invention.

Of greater importance is the ability of the array to accurately locate a source in space. FIG. 23 shows the absolute spatial error of the peak array response plotted vs. the x-location of the source. It should be noted that a finer mesh using a grid of 0.1 in. in the array response was used to obtain the measures of spatial error. The error is seen to randomly fluctuate as a function of position, with a mean value of 0.3 in. These values seem reasonable considering the accuracy in distance measurements in setting up the experiment was ±0.25 in. Thus, the performance at 6 kHz appears to be independent of the source location. A novel directional acoustic array has been presented using MEMS sensor technologies, a hybrid sensor packaging scheme, printed circuit board construction technique, and modem signal processing system to produce a high-speed, cost-effective, modular, array measurement system. In addition to reducing the cost, the use of a printed circuit board as the array structure allows for the potential integration of the signal conditioning, data acquisition, and/or signal processing hardware. The estimated total cost of the 16-channel array, excluding labor and the cost of the data acquisition and signal processing system, is approximately $1140, or $71.25 per channel. This is less than a single ⅛-inch Bruel & Kjaer type 4138 microphone with preamplifier and power supply ($3365), commonly used in conventional microphone arrays. The hybrid packages can be interchanged between low-cost printed circuit boards of various geometries, further reducing the costs. The use of high-speed data acquisition and digital signal processors has enabled near real-time computation of the time-averaged cross-spectral matrices. This provides the user with almost instant access to array response results and eliminates the need to save large amounts of time-series data. The resulting time savings can reduce the experimental costs, particularly for large wind tunnel studies.

The results from calibrations of the hybrid package and array confirm and verify the functionality of the system. From plane wave tube calibrations, the hybrid microphone packages show an average sensitivity of 831 µV/Pa with matched magnitude (±0.6 dB) and phase (±1 degree) responses. From tests conducted in an anechoic chamber, the array shows accurate source localization capabilities of ±0.3 in. It has a minimum detectable signal of 47.8 dB SPL for a 1 Hz bin at 6 kHz and a maximum input of 160 dB SPL. The usable frequency range is limited to 3 kHz to 8 kHz. A larger number of sensors can broaden the frequency range by increasing the overall array size while maintaining small intersensor spacings. The array noise floor was experimentally verified to be 11.6 dB below the noise floor of the individual microphones, as predicted by the theoretical array gain.

For this array system, an extensive calibration is needed to confirm determine the response over a larger parameter space. The calibration should include in situ calibrations of the microphones and a complete analysis of the directivity and accuracy of the array over a broad frequency range. An array, similar in construction, including more sensors could be constructed to examine the response over a larger frequency range. Additional efforts could be aimed at reducing the size and increasing the physical robustness of the hybrid packages and improving the construction techniques used for the array.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modification, both as to equipment details and operating procedures can be effected without departing from the scope of the invention itself. Further, it should be understood that, although the present invention has been described with reference to specific details of certain embodiments thereof, it is not intended that such details should be regarded as limitations upon the scope of the invention except as and to the extent that they are included in the accompanying claims.

What is claimed is:

1. A printed circuit board array responsive to aeroacoustic waves, comprising:
    a. a printed circuit board having a first surface and an opposing second surface;
    b. a plurality of sockets distributed over the first surface of the printed circuit board;
    c. a plurality of microphone packages, wherein each microphone package is received in a corresponding socket and contains at least one microphone responsive to an aeroacoustic wave, each of said microphones including a semiconductor substrate, a cavity formed in said substance, a diaphragm covering said cavity, and a vent channel in fluid communication with said cavity and an atmosphere surrounding said array, and
    d. at least one signal processor disposed on said circuit board, an input of said signal processor coupled to output of said plurality microphone packages, said processor beamforming signals received from said plurality of microphone packages and outputting a combined signal therefrom.

2. The printed circuit board array of claim 1, further comprising a laser diode positioned on the first surface of the printed circuit board for aiming the printed circuit board array toward a source of the aeroacoustic wave.

3. The printed circuit board array of claim 1, further comprising a piezoresistive layer on said diaphragm, wherein said microphone is a piezoresistive microphone.

4. The printed circuit board array of claim 1, further comprising at least one support layer positioned below the second surface of the printed circuit board.

5. The printed circuit board array of claim 4, wherein each of the support layers comprises a garolite stiffening layer.

6. The printed circuit board array of claim 5, wherein each of the garolite stiffening layer is bonded to the printed circuit board.

7. The printed circuit board array of claim 1, wherein the printed circuit board comprises a double-sided copper clad.

8. The printed circuit board array of claim 1, wherein the printed circuit board has a center, and the plurality of microphone packages are distributed over the first surface of the printed circuit board along a plurality of concentric rings, each ring having a radius measured from the center of the printed circuit board different from the radius of any other ring.

9. The printed circuit board array of claim 8, wherein an equal number of the microphone packages are distributed over each ring.

10. The printed circuit board array of claim 1, wherein each microphone package includes at least one amplifier coupled to and spaced from the microphone with a separation smaller than 0.5 mm.

11. The printed circuit board array of claim 10, wherein the microphone is a piezoresistive microphone.

12. The printed circuit board array of claim 10, wherein:
   a. said semiconductor substrate has a first surface and a second surface;
   b. said microphone positioned on the first surface of the semiconductor substrate and having an input and a first output and a second output, wherein the input receives a biased voltage, and the microphone generates an output signal responsive to the aeroacoustic wave between the first output and the second output;
   c. an amplifier positioned on the first surface of the semiconductor substrate and having a first input and a second input and an output, wherein the first input of the amplifier is electrically coupled to the first output of the microphone and the second input of the amplifier is electrically coupled to the second output of the microphone for receiving the output signal from the microphone;
   d. a first capacitor and a first resistor forming a first RC pair positioned on the first surface of the semiconductor substrate and being electrically coupled between the first input of the amplifier and the first output of the microphone; and
   e. a second capacitor and a second resistor forming a second RC pair positioned on the first surface of the semiconductor substrate and being electrically coupled between the second input of the amplifier and the second output of the microphone,
wherein the output signal from the microphone has a DC component and an AC component, and the first and second RC pairs substantially block the DC component and allow the AC component of the output signal from the microphone to pass, thereby to allow the amplifier to generate a low impedance signal at the output, and wherein the amplifier is spaced from the microphone with a separation smaller than 0.5 mm.

13. The printed circuit board array of claim 12, wherein the microphone comprises four piezoresistors forming a Wheatstone bridge that has a first arm, an opposing second arm, a third arm, and an opposing fourth arm, the first arm being electrically coupled to the input of the microphone, the opposing second arm being electrically coupled to ground, the third arm being electrically coupled to the first input of the amplifier, and the opposing fourth arm being electrically coupled to the second input of the amplifier.

14. The printed circuit board array of claim 13, wherein the first capacitor is electrically coupled in series between the third arm of the Wheatstone bridge and the first input of the amplifier, and the first resistor is electrically coupled in parallel between the second arm of the Wheatstone bridge and the capacitor.

15. The printed circuit board array of claim 14, wherein the second capacitor is electrically coupled in series between the fourth arm of the Wheatstone bridge and the second input of the amplifier, and the second resistor is electrically coupled in parallel between the second arm of the Wheatstone bridge and the capacitor.

16. The printed circuit board array of claim 15, wherein the first resistor and the second resistor are jointly coupled to the second arm of the Wheatstone bridge.

17. The printed circuit board array of claim 16, wherein the semiconductor substrate comprises a silicon layer.

18. The printed circuit board array of claim 17, wherein the microphone package further comprises:
   a. a package body positioned underneath the semiconductor substrate for supporting the semiconductor substrate; and
   b. a peripheral portion extending away from the package body.

19. The printed circuit board array of claim 18, wherein the package body is electrically coupled to ground for electromagnetic shielding.

20. The printed circuit board array of claim 18, wherein the microphone package further comprises a lid positioned above the semiconductor substrate.

21. The printed circuit board array of claim 20, wherein the lid comprises:
   a. a body; and
   b. a peripheral portion extending away from the body,
wherein the body is complementarily sized such that when the lid is positioned over the semiconductor substrate, the peripheral portion of the lid matches to and supported by the peripheral portion of the package, and the body covers the semiconductor substrate and components positioned on the semiconductor substrate.

22. The printed circuit board array of claim 21, wherein the lid is made from a material that is substantially transparent to the aeroacoustic wave.

23. The printed circuit board array of claim 21, wherein the lid is electrically coupled to ground for electromagnetic shielding.

* * * * *

UNITED STATES PATENT AND TRADEMARK OFFICE
CERTIFICATE OF CORRECTION

PATENT NO. : 7,092,539 B2  Page 1 of 1
APPLICATION NO. : 09/997113
DATED : August 15, 2006
INVENTOR(S) : Sheplak et al.

It is certified that error appears in the above-identified patent and that said Letters Patent is hereby corrected as shown below:

Claim 1, column 18, line 30, replace "output" with --outputs--
Claim 12, column 19, line 4, after "microphone" add --is--.

Signed and Sealed this

Nineteenth Day of December, 2006

JON W. DUDAS
*Director of the United States Patent and Trademark Office*